(12) United States Patent
Djedovic et al.

(10) Patent No.: US 11,566,691 B2
(45) Date of Patent: Jan. 31, 2023

(54) ELECTROMOTIVE DRIVE FOR MOTOR VEHICLE APPLICATIONS

(71) Applicant: Kiekert AG, Heiligenhaus (DE)

(72) Inventors: Benjamin Djedovic, Oberhausen (DE); Tim Sonnenschein, Wuppertal (DE); Winfried Schlabs, Bochum (DE); Claus Töpfer, Sindelfingen (DE)

(73) Assignee: Kiekert AG, Heiligenhaus (DE)

(*) Notice: Subject to any disclaimer, the term of this patent is extended or adjusted under 35 U.S.C. 154(b) by 353 days.

(21) Appl. No.: 16/753,861

(22) PCT Filed: Sep. 19, 2018

(86) PCT No.: PCT/DE2018/100797
§ 371 (c)(1),
(2) Date: Sep. 6, 2020

(87) PCT Pub. No.: WO2019/068282
PCT Pub. Date: Apr. 11, 2019

(65) Prior Publication Data
US 2021/0010572 A1    Jan. 14, 2021

(30) Foreign Application Priority Data

Oct. 6, 2017    (DE) ............... 10 2017 123 210.9

(51) Int. Cl.
*H02K 7/116* (2006.01)
*B60K 6/28* (2007.10)
(Continued)

(52) U.S. Cl.
CPC ............. *F16H 19/02* (2013.01); *B60L 53/16* (2019.02); *F16H 57/021* (2013.01); *F16H 57/03* (2013.01);
(Continued)

(58) Field of Classification Search
CPC .......... F16H 57/021; F16H 2057/0216; F16H 2057/02034; H02K 7/116; H02K 5/04; B60L 2270/32
See application file for complete search history.

(56) References Cited

U.S. PATENT DOCUMENTS

| | | | | |
|---|---|---|---|---|
| 5,086,900 A | * | 2/1992 | Kikuta | F16H 25/20 74/89.41 |
| 5,839,320 A | * | 11/1998 | Komachi | H02K 5/08 310/91 |
| 7,275,282 B2 | * | 10/2007 | Brose | E05B 81/06 292/144 |
| 8,376,768 B2 | | 2/2013 | Kurumizawa | |

(Continued)

FOREIGN PATENT DOCUMENTS

| | | |
|---|---|---|
| CN | 202695855 U | 1/2013 |
| DE | 102007002025 A1 | 7/2008 |

(Continued)

OTHER PUBLICATIONS

Translation of International Search Report dated Nov. 15, 2018 for PCT/DE2018/100797.

*Primary Examiner* — Jake Cook
(74) *Attorney, Agent, or Firm* — Renner, Otto, Boisselle & Sklar, LLP

(57) ABSTRACT

An electromotive drive for motor vehicle applications. In particular, the electromotive drive is part of a locking device of an electric connection device for electric or hybrid motor vehicles. For this purpose, an electric motor and a multistage transmission which is arranged downstream of the electric motor are provided as drive elements for acting on an actuating element, and a drive housing which houses drive elements is also provided. The actuating element is a locking element of the locking device for example. The drive housing is equipped with inner and/or edge-side protrusions. The protrusions have direct bearing points for individual drive elements or all of the drive elements.

19 Claims, 4 Drawing Sheets

(51) Int. Cl.
  *F16H 55/08* (2006.01)
  *F16H 19/02* (2006.01)
  *B60L 53/16* (2019.01)
  *F16H 57/021* (2012.01)
  *F16H 57/03* (2012.01)
  *H01R 13/639* (2006.01)
  *F16H 57/02* (2012.01)

(52) U.S. Cl.
  CPC ........... *H01R 13/639* (2013.01); *H02K 7/116* (2013.01); *B60K 6/28* (2013.01); *B60L 2270/32* (2013.01); *B60L 2270/34* (2013.01); *B60Y 2200/91* (2013.01); *B60Y 2200/92* (2013.01); *F16H 55/08* (2013.01); *F16H 2057/0216* (2013.01); *F16H 2057/02034* (2013.01); *F16H 2057/02082* (2013.01)

(56) References Cited

U.S. PATENT DOCUMENTS

| | | | |
|---|---|---|---|
| 8,739,586 B2* | 6/2014 | Yuan | E05B 15/04 |
| | | | 292/144 |
| 8,900,006 B2 | 12/2014 | Gaul | |
| 2013/0154402 A1 | 6/2013 | Basavarajappa | |
| 2013/0260597 A1 | 10/2013 | Kurumizawa | |
| 2017/0159793 A1* | 6/2017 | Schorpp | H02K 7/081 |
| 2017/0355298 A1* | 12/2017 | Cahall | B60P 7/0838 |
| 2018/0045292 A1* | 2/2018 | Richter | F16H 57/021 |

FOREIGN PATENT DOCUMENTS

| | | |
|---|---|---|
| EP | 1264735 A1 | 12/2002 |
| EP | 1775163 A2 | 4/2007 |
| EP | 2576264 A1 | 4/2013 |
| EP | 2705975 A1 | 3/2014 |
| WO | 2010/149426 A1 | 12/2010 |

* cited by examiner

ELECTROMOTIVE DRIVE FOR MOTOR VEHICLE APPLICATIONS

FIELD OF INVENTION

The invention relates to an electromotive drive for automotive applications, in particular as a component of a locking device of an electric connection device for electric or hybrid motor vehicles, comprising an electric motor, also comprising a multistage transmission arranged downstream, as drive elements for acting upon an actuating element, for example of a locking element of the locking device, and comprising a drive housing which houses the drive elements.

BACKGROUND OF INVENTION

A large number of electromotive drives for automotive applications are known in the art and are used for example in connection with window controllers, seat adjustments, door mirrors, etc. Furthermore, such electromotive drives are known in connection with motor vehicle door latches, for example as closing drives or locking drives. A common feature of all the electromotive drives is that linear actuating movements are often reproduced, and an electric motor used at this point is supplied with a low DC voltage.

Such electromotive drives are increasingly also used as components and in conjunction with locking devices of an electric connection device for electric or hybrid motor vehicles. Examples of such electromotive drives are described in DE 10 2007 002 025 A1. Here the electromotive drive, as a component of a locking device or locking means, serves to lock a charging plug relative to a charging plug socket to prevent removal. For this, the known drive acts on a movable bolt.

The releasable anchoring of a charging plug in the charging plug socket by means of a movable locking element is particularly important in connection with electric connection devices for electric or hybrid motor vehicles. This is because the charging plug in general constitutes an electric connection to a charging column as a component of a charging infrastructure. As a result it is possible to (re)charge batteries in the electric or hybrid motor vehicle with electric power, for example on a charging column as a component of the charging infrastructure.

Since high voltage is usually used at this point, it is necessary to anchor the charging plug releasably in the charging plug socket with the aid of the movable locking element in order to prevent any risks to the user's health.

The releasable locking of the charging plug relative to the charging plug socket is additionally important, as in this way in general an unambiguous association between user and charging column can take place in order to able to be able to bill the specific user for the electrical power obtained. Such a procedure is described for example in WO 2010/149426 A1. In this way in particular so-called "power stealing" can be avoided.

In the generic prior art according to CN 202695855 U, in general, a multipart drive housing produced from plastic is provided, which houses the individual drive elements located in the interior and protects them against environmental influences. Thus, the known drive housing also has some protrusions which function, for example, as accommodating pins for bearings or ball bearings attached thereto. A gear of a multistage transmission connected downstream of an electric motor is mounted, for example, with the aid of the bearings or ball bearings.

Such embodiments have, on the one hand, a significant weight due to the additionally provided bearing in particular for the multistage transmission. On the other hand, the production and installation are complex, because the relevant bearing must first be mounted in the drive housing, before the individual drive elements can be placed therein. The invention seeks to create a remedy here.

SUMMARY OF INVENTION

The invention is based on the technical problem of further developing such an electromotive drive for automotive applications so that overall the weight is decreased, and the costs of production and installation are reduced by comparison with the prior art.

In order to solve this technical problem within the scope of the invention, an electromotive drive for automotive applications is characterized in that the drive housing is equipped with internal and/or edge-side protrusions, which function as direct bearing points for individual drive elements or all drive elements act or form such bearing points. In other words, the protrusions generally have direct bearing points for individual drive elements or all drive elements.

Thus, within the scope of the invention first of all the drive housing has the internal and/or edge-side protrusions. Such protrusions are also known in principle from the prior art according to CN 202695855 U, which forms the starting point. In contrast to this, however, the relevant protrusions according to the invention serve to define direct bearing points or have such direct bearing points.

In this connection the term "direct bearing point" means that the associated drive element mounted therein is accommodated directly in the relevant bearing point and additional interposed bearings are neither provided nor present and certainly are not necessary. In this connection the invention starts from the recognition that the drive elements mounted with the aid of the direct bearing points and the protrusions with the relevant bearing points are usually produced from the same or similar material, typically from plastic.

As a result a sliding bearing having low friction coefficients (plastic-plastic) is produced overall and automatically between the direct bearing point made from plastic in the associated protrusion made from plastic and the drive element, likewise made from plastic, which for example is movably mounted therein. As a consequence of this, the use of additional interposed bearings as in the prior art is unnecessary. As a result the electromotive drive according to the invention can be of particularly lightweight construction, because additional solid bearings are unnecessary. Moreover, the production and installation costs are significantly reduced, because the additional bearings and installation thereof are omitted. The significant advantages can be seen here.

According to an advantageous embodiment the protrusions can be equipped with bearing points for stationary drive elements. Such stationary drive elements, by way of example and generally, are the electric motor of the electromotive drive. Furthermore, the protrusions can also be equipped with bearing points for movable drive elements. The movable drive elements are usually shafts which in each case define individual stages of the multistage transmission.

The protrusions are advantageously formed on the drive housing, and furthermore are preferably integrally formed thereon. As a consequence thereof, the protrusions and the drive housing are particularly advantageously designed as a one-piece plastic molding. As a result the production of the drive housing together with the protrusions and consequently also the bearing points in or on the drive element takes place particularly simply, quickly and cost-effectively. Thus, additional production and installation steps are not necessary.

In fact, the protrusions are generally designed as housing ribs of the drive housing. As a result the protrusions or housing ribs assume a multiple function. First of all, they serve to form the direct bearing points for individual drive elements or all drive elements. Furthermore, the protrusions or housing ribs additionally ensure a reinforcement of the drive housing, which is significant in so far as the described electromotive drive, as preferred component of the locking device for the electric connection device in electric or hybrid motor vehicles, is often subjected to high mechanical forces.

This may be attributed to the fact that the actuating element or locking element of the locking device is often mounted in the drive housing. As soon as the locking element has penetrated into a recess of the charging plug in the locked state and traction forces act on the charging plug or a cable connected thereto, these forces are also simultaneously transmitted to the drive housing by means of the locking element. As a result, a reinforcement of the drive housing becomes particularly important. The invention takes account of the protrusions formed as housing ribs.

In order to achieve and to implement the multiple functionality particularly advantageously, the relevant housing ribs generally have an extent in the transverse and/or longitudinal direction, by comparison with the axial direction of the associated drive element. In other words, the axial direction of the drive element predetermines the longitudinal direction. Since furthermore, and advantageously, the individual shafts of the multistage transmission are arranged in parallel with one another, the protrusions or housing ribs consistently have an extent in the transverse direction. As a result, at the same time the required reinforcement of the drive housing takes place by means of the housing ribs, because in the example they are arranged in the same direction and spaced-apart from one another.

The bearing points typically serve not only for mounting of the relevant drive element. However, the bearing points also assume additional functions in such a way that, with their help, the relevant drive element is secured axially and/or radially.

Ultimately, the bearing points are typically opened in each case in the installation direction of the drive elements. In this way the drive element can be mounted with the aid of the bearing points and can be inserted without difficulty in the relevant installation direction into the relevant bearing points or can be fitted thereon, so that as a consequence thereof the drive elements occupy their intended position and are immediately ready for operation. Further mounting means or additional bearings are explicitly unnecessary.

The bearing points serve for reinforcement and/or stabilization of the drive housing. As a result, a particularly stable drive housing can be provided, which is particularly advantageous in particular in view of the high forces which the locking device must be able to withstand.

Finally, the provisions of the invention, according to which the drive housing is generally formed in two parts with a lower shell including the protrusions and an upper shell which closes the lower shell as a closure for the lower shell, are directed towards simple installation. Since the lower shell with the protrusions immediately after insertion of the relevant drive element is ready for operation, after subsequent installation of the upper shell which closes the lower shell, the electromotive drive according to the invention can be mounted in or on a body of the electric or hybrid motor vehicle. All of this is achieved simply and with significant cost advantages relative to the prior art.

BRIEF DESCRIPTION OF DRAWINGS

The invention is explained in greater detail below with reference to drawings which merely show one preferred exemplary embodiment. In the drawings.

DETAILED DESCRIPTION

Figure 2:
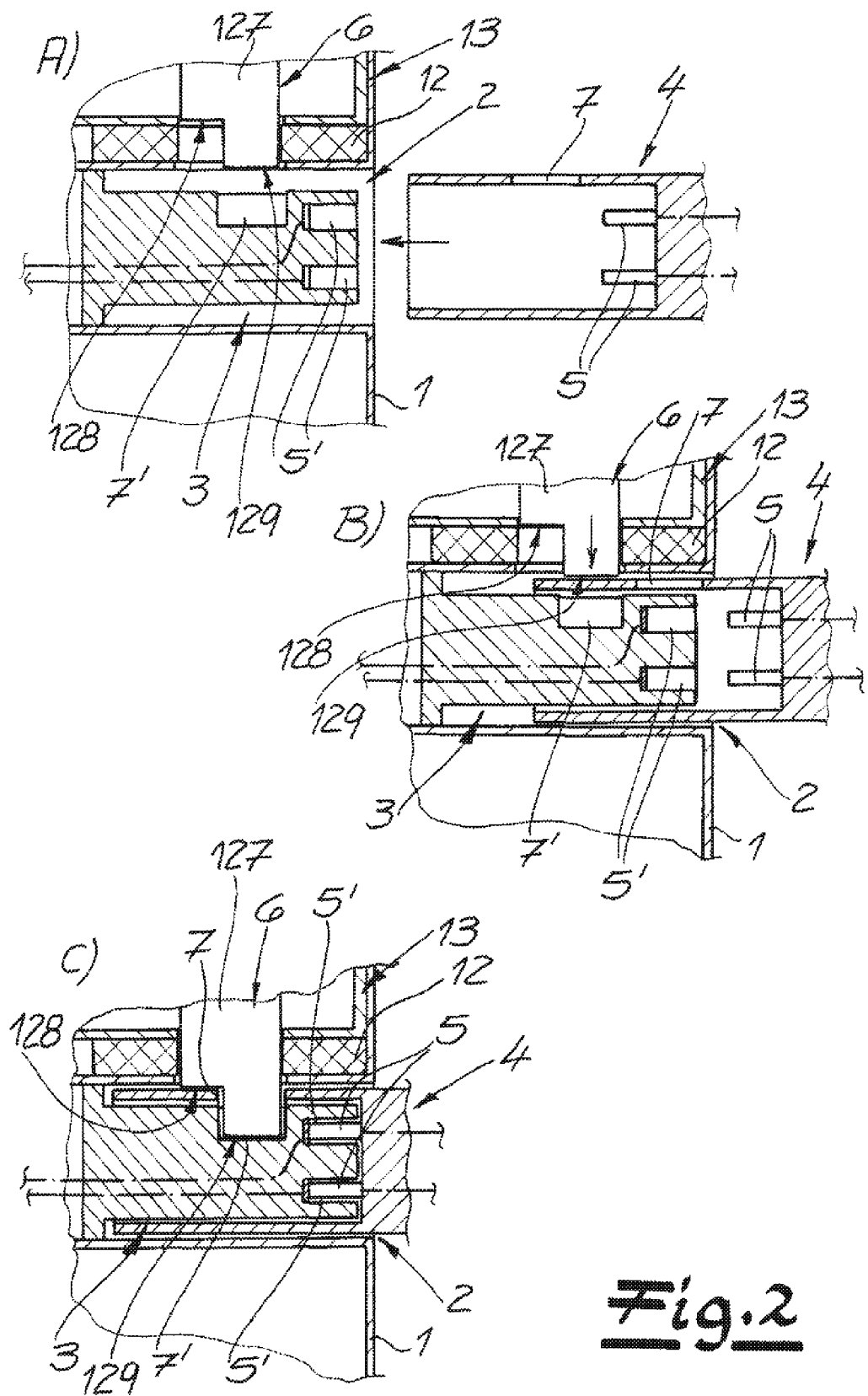
FIGS. 2A to 2C show the locking process between charging plug and charging plug socket.
Figure 3:
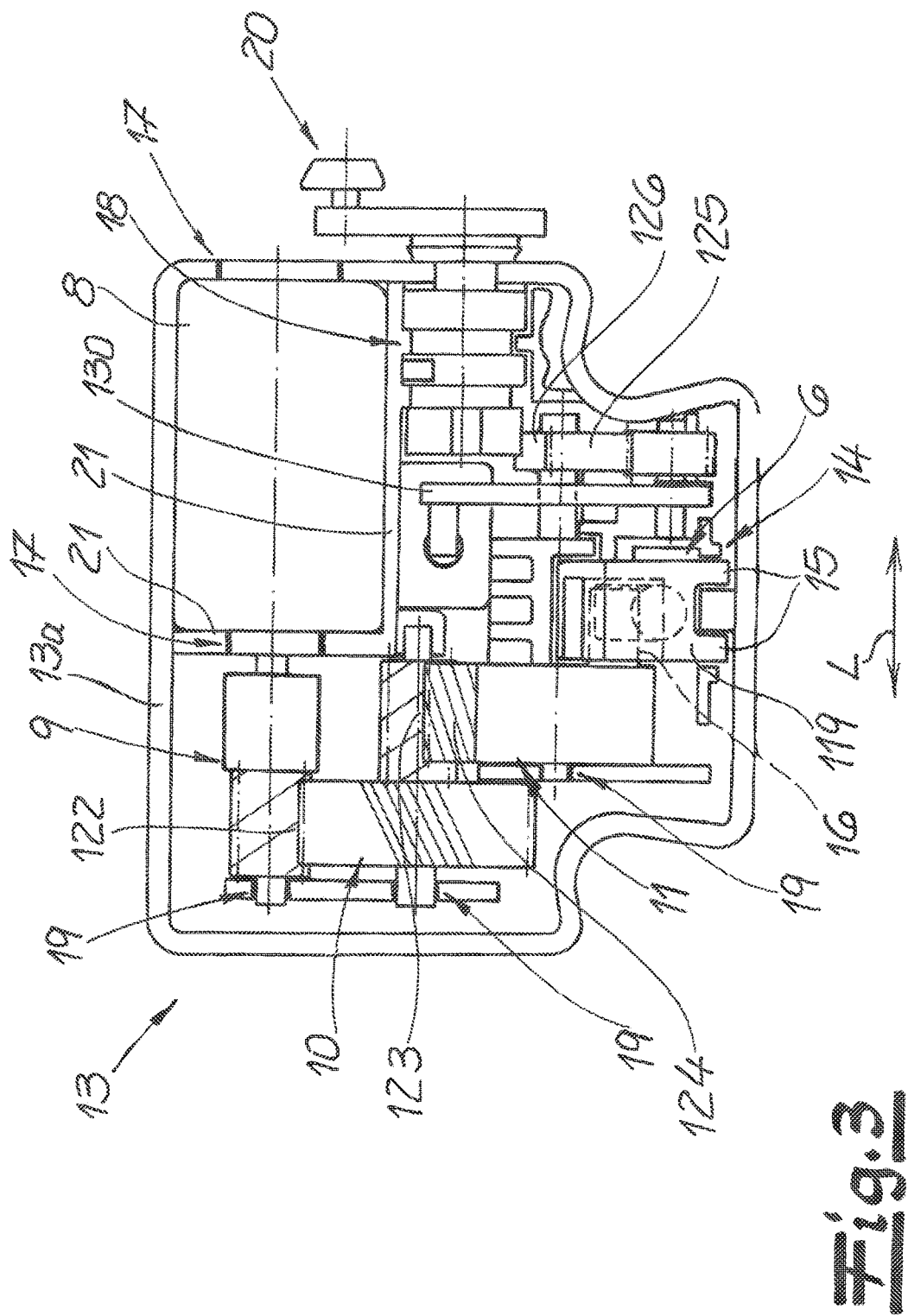
FIG. 3 shows an inside view of the drive according to FIG. 1

An electromotive drive for automotive applications is shown in the overview according to FIG. 3. Within the context of the exemplary embodiment and without limitation, the electromotive drive constitutes a component of a locking device of an electric connection device for electric or hybrid motor vehicles. In this connection only part of a body 1 of the electric or hybrid motor vehicle in question is illustrated in the representations in FIGS. 2A to 2C. The body 1 is equipped with a recess 2.

A charging plug socket 3 is located in the recess 2. The charging plug socket 3 can be coupled electrically and by releasable locking to a charging plug 4, which for this purpose is introduced into the recess 2 in the body 1 and is coupled by electrical connection to the charging plug socket 3.

Figure 1:
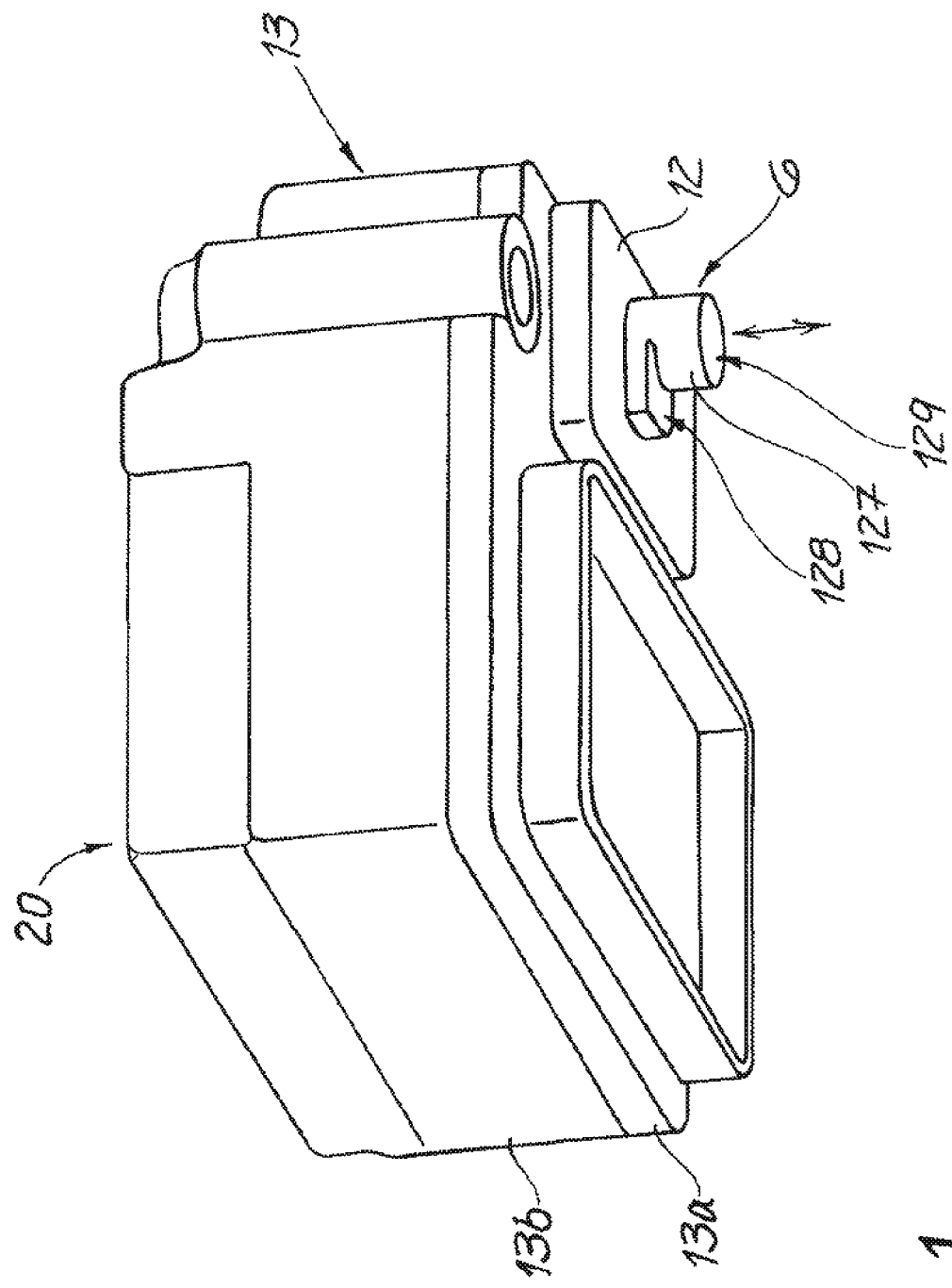
FIG. 1 shows the electromotive drive according to the invention in an overview.

For this purpose, the charging plug 4 has plug contacts 5 which are merely indicated in FIG. 1 and engage in associated plug sockets 5' in the interior of the charging plug socket 3. Of course, the procedure can also be reversed. In this case the charging plug socket 3 is equipped with the plug contacts 5 which engage releasably in associated plug sockets 5' of the charging plug 4, but are not illustrated.

In order to lock the charging plug 4 releasably with the charging plug socket 3, a movable locking element 6 is provided. In the exemplary embodiment the movable locking element 6 is a locking pin or locking rod which is made from plastic. In alternative embodiments the locking element 6 can also be made from a metal. According to the exemplary embodiment the lock element 6 is formed as a plastic injection-molded part or can form such a part. For releasable locking of the charging plug 4 with respect to the charging plug socket 3 the locking element 6 engages in an associated recess 7 in the charging plug 4.

Moreover, during locking of the charging plug 4 with respect to the charging plug socket 3 the locking element 6 additionally engages in a recess 7' in the charging plug socket 3. The unlocked state of the charging plug 4 relative to the charging plug socket 3 is illustrated in FIG. 2A. FIG. 2C shows the locked state. The transition from the unlocked position to the locked position of the locking element is 6 illustrated in FIG. 2B.

The locking element 6 can be moved relative to the two recesses 7, 7', in order to produce or cancel the locking between the charging plug 4 and the charging plug socket 3. Movements of the locking element 6 in its longitudinal direction, as indicated by a double arrow in FIG. 1, correspond to this. According to the exemplary embodiment, the electromotive drive ensures the actuating movements of the locking element 6. The longitudinal direction of the locking element 6 extends perpendicularly to a plane in which shafts 9, 10, 11 of the drive are arranged. A seal 12 on a drive housing 13 ensures that the locking element 6, during its actuating movements, is sealed relative to the drive housing 13.

The electromotive drive is accommodated in its own drive housing 13 and is enclosed as a whole by the drive housing 13. The applies to all the drive elements, that is to say an electric motor 8 and a multistage gear unit connected downstream of the electric motor 8.

Furthermore, since the locking element 6 is mounted in the drive housing 13, overall an assembly or an installation module is provided which is ready for installation. Of course, the invention also covers solutions in which the drive and the charging plug socket 3 are accommodated in a common housing. However, this is not illustrated in the drawings.

The drive comprises an electric motor 8, a first shaft 9, a second shaft 10, a third shaft 11 and a locking lever 119 on which the locking element 6 abuts. The locking lever 119 is set in motion by means of the electric motor 8 and the shafts 9-11, so that the locking element 6 is moved. In this case the locking lever 19 is moved perpendicular to a plane in which the shafts 9-11 are arranged. In the exemplary embodiment the locking lever 119 and the locking element 6 are formed integrally with one another.

The locking element 6 has a stepped configuration with a projection 127, so that the locking element 6 has a first contact surface 129, located higher, on the projection 127, and a second contact surface 128, located lower. In this case the relative details "located higher" and "located lower" relate to a distance from a housing-side end of the locking element 6. By means of the two contact surfaces 128, 129 it is possible to detect whether the charging plug 4 has been introduced sufficiently deeply into the charging plug socket 3. This utilizes the fact that in the normal operating mode, that is to say when the charging plug 4 is introduced sufficiently deeply into the charging plug socket 3, the locking element 6 not only passes through the recess 7 in the charging plug 4 but also engages in the recess 7' in the charging plug socket, in order to lock. In this case the recesses 7, 7 are chosen with regard to their size and orientation relative to one another so that in the normal operating mode the locking element 6 is passed through the recess 7 in the charging plug 4 and with the projection 127 is introduced into the recess 7' in the charging plug socket 3, whereas the second contact surface 128 comes to rest on a surface of the charging plug 3 and the movement of the locking element 6 is stopped thereby. In addition it is monitored how long the electric motor 8 of the drive was operated before the stopping of the locking element 6, for example by means of monitoring of a number of rotations of one of the shafts 9-10 or by means of a current consumption of the electric motor 8. In this way it can be ascertained whether the normal mode is in operation. If the charging plug 3 is not introduced sufficiently far, the first contact surface 129 already comes to lie on the projection 127 on the charging plug 3 and the locking element 6 has already previously been stopped. In addition, a third situation can be identified, that is to say if the charging plug 3 is broken and thus, even if it is introduced sufficiently far, a secure locking is not guaranteed. In this case the locking element 6 can be introduced more deeply than in the normal operating mode.

The drive or electromotive drive is composed of an electric motor 8 and a transmission consisting of a first shaft 9, a second shaft 10 and a third shaft 11. The first shaft 9 forms an output shaft of the electric motor 8 and meshes by means of a gearing 122, which is configured as an evoloid gearing, with the second shaft 10. The second shaft 10 likewise has a gearing 123, by means of which the second shaft 10 meshes with the third shaft 11. The gearing 123 of the second shaft 10 can also be configured as an evoloid gearing. The evoloid gearing provides a high to very high transmission ratio of, for example, 1:30, 1:80, 1:140 or 1:320 with a relatively compact space requirement. The third shaft 11 operates according to the exemplary embodiment and in a non-limiting manner, by means of the eccentric or a pin 17 and having regard to the guiding 14, 15 onto the locking element 6, and transmits the actuating movements brought about by the drive to the locking element 6.

The third shaft 11 has, in addition to a first gearing 124 which meshes with the gearing 123 of the second shaft, a second gearing 125 which is arranged on one end of the third shaft 11 opposite the first gearing 124. The second gearing 125 serves to drive a switch actuation 130, by means of which a sensor 16 configured as a microswitch is actuated. A rotation of the third shaft 11 which has taken place is detected by means of the actuation of the microswitch. By this means the microswitch detects how far the third shaft 11 has rotated or how long the drive has been in operation.

By means of the drive the locking element 6 carries out actuating movements relative to a guide 14, 15. According to the exemplary embodiment the guide 14, 15 is designed in two parts and is composed substantially of a stationary housing passage 14 in the drive housing 13, on the one hand, and a movable support 15, on the other hand, as guiding components 14,15 in each case.

The housing passage 14 and also the locking element 6 can be equipped in each case with corresponding longitudinal guide means which are not explicitly illustrated in detail. The longitudinal guide means of the locking element 6 can be bars extending in the longitudinal direction or also a groove extending in the longitudinal direction. On the other hand, the longitudinal guide means of the housing passage 14 is designed as a corresponding groove and matching the bars of the locking element 6 extending in the longitudinal direction. If the locking element 6 with the groove extending in the longitudinal direction is formed as longitudinal guide means, it is recommended to equip the housing passage 14 with a projection engaging in the corresponding groove. Of course, mixed forms are also conceivable. It is also possible in principle to dispense with such corresponding longitudinal guide means if the locking element 6, for example, has corners or overall has a polygonal configuration instead of the cylindrical shape implemented in the exemplary embodiment.

In the exemplary embodiment the longitudinal guide means or the movable support 15 is provided on an offset of the third shaft 11 of the drive 8 to 11. In fact the relevant shaft 11 according to the exemplary embodiment has a pin 16 which, in the context of the illustration, is the offset of the shaft 11.

The locking element 6 including the guides 14, 15 and the described electromotive drive overall form the locking device already previously described for the electric connection device. Instead of acting on the locking element 6, the electric motor 8 together with the multistage transmission connected downstream can also serve for action upon a differently designed actuating element which, however, is not illustrated in the drawings.

According to the invention, the drive housing 13 is configured in two parts. In fact this is composed substantially of a lower shell 13a and an upper shell 13b closing the lower shell 13a as a closure for the lower shell 13a (cf. FIGS. 3 and 4). Moreover, the drive housing 13 has inner and/or edge-side protrusions 21. The relevant protrusions 21 have direct bearing points 17; 18, 19 for individual drive elements or all of the drive elements or themselves function as such a bearing point 17; 18, 19.

The relevant bearing point 17 is one by means of which in the exemplary embodiment stationary drive elements 8 can be mounted in the interior of the drive housing 13. In the present case the stationary drive element 8 is the electric motor 8 already previously described. This is previously at each end of its housing with cylindrical protrusions which are placed in the associated bearing points 17 for the aforementioned stationary drive element or the electric motor 8 and are accommodated there. The relevant bearing point 17 can be located in an associated protrusion 21. The protrusion 21, like other protrusions 21, overall involves housing ribs which in the exemplary embodiment serve not only for mounting the drive elements, but additionally also for reinforcing the drive housing 13 overall.

In addition to the aforementioned bearing points 17 for stationary drive elements or the electric motor 8, further bearing points 18, 19 are then provided, which are used and serve for mounting movable drive elements. In the exemplary embodiment the movable drive elements 9 to 11 are shafts of the multistage transmission connected downstream of the electric motor 8.

In fact, at this point an output shaft 9 of the electric motor 8 is provided, which meshes with a second stage of the multistage transmission with associated shaft 10 by means of a gear. The shaft 10 is in turn coupled to a further shaft 11 at the output end. The shaft 11 has the offset or the pin 16 and consequently an eccentric. The pin 16 engages in the support 15 as a guiding component of the aforementioned guide 14, 15 for the locking element 6.

The individual shafts are in each case arranged parallel to one another. Moreover, in the exemplary embodiment the individual shafts and associated gears are advantageously made from plastic. The same applies to the drive housing 13. Since, furthermore, the protrusions 21 configured as housing ribs are preferably formed integrally on the drive housing 13 and, furthermore, the protrusions 21 and the drive housing 13 overall form a one-piece plastic molding, the movable drive elements can be coupled directly to the associated bearing points 18, 19. In this connection all of the bearing points 17; 18, 19 are each opened in the installation direction of the drive elements 8 to 11, according to the exemplary embodiment upwards in the viewing direction of an observer in the plan view of the lower shell 13a according to FIG. 3.

As a result the drive elements 8 to 11 can be inserted from above into the relevant bearing points 17; 18, 19 and, following this, the drive elements are immediately ready for use and at the same time are satisfactorily mounted.

Due to the design of the shafts and consequently of the movable drive elements made from plastic and, simultaneously, the fact that the protrusions or housing ribs 21 are likewise made from plastic, in this connection overall sliding bearings in the region of the associated bearing points 18, 19 can be seen, which operate with particularly low friction due to the "plastic-plastic" friction. Simultaneously a permanent operation is guaranteed. This is because the bearing points 18, 19 for the movable drive elements 9 to 11, just like the bearing points 17 for the stationary drive elements 8, in each case have a U-shaped cross section and are opened upwards in the protrusions or housing ribs 21. As a result, overall, the "directness" of the bearing points 17; 18, 19 is obtained.

By comparison with the axial direction of the associated drive elements 8 to 11, the housing ribs 21 generally have dimensions in the transverse direction which coincide with the longitudinal direction L indicated in FIG. 3. Since in the exemplary embodiment the shafts 9 to 11 are arranged in parallel with one another and in parallel with the electric motor 8, the axial direction coincides with the longitudinal direction L of the drive housing 13 indicated in FIG. 1. On the other hand, the housing ribs 21 are oriented and arranged predominantly transversely to the longitudinal direction L. In this way the protrusions or housing ribs 21 have a spaced-apart arrangement in the same direction relative to one another, that is to say predominantly in the transverse direction by comparison with the longitudinal direction L, so that as a result the aforementioned reinforcement of the drive housing 13 is apparent.

The respective bearing points 17; 18, 19 can be configured both for axially and also radially securing the relevant drive element 8 to 11. This applies in particular to the bearing point 18 in the approximately central housing rib 21, by means of which a separate and not explicitly designated additional shaft is mounted on a crank 20 in the interior of the drive housing 13. The crank 20 constitutes a component of an emergency unlocking system. By means of the emergency unlocking system or the crank 20, in the event of a malfunction of the electric motor 8 the multistage transmission can nevertheless be acted upon so that as a result the locking element 6 is moved into its retracted position and as a result out of the recess 7 in the charging plug 4 and also becomes free relative to the recess 7' in the charging plug socket 3. As a result, in an emergency the charging plug 4 can be unlocked from the charging plug socket 3 even in the event of a malfunction of the drive. The third shaft 11 has a third gearing 12б, which is configured as an individual tooth in the exemplary embodiment. In the event of emergency actuation, the emergency unlocking device, which can be driven by means of the crank 20, acts on the third gearing 12б in order to reset the third shaft 11 and thus the entire drive.

Figure 4:
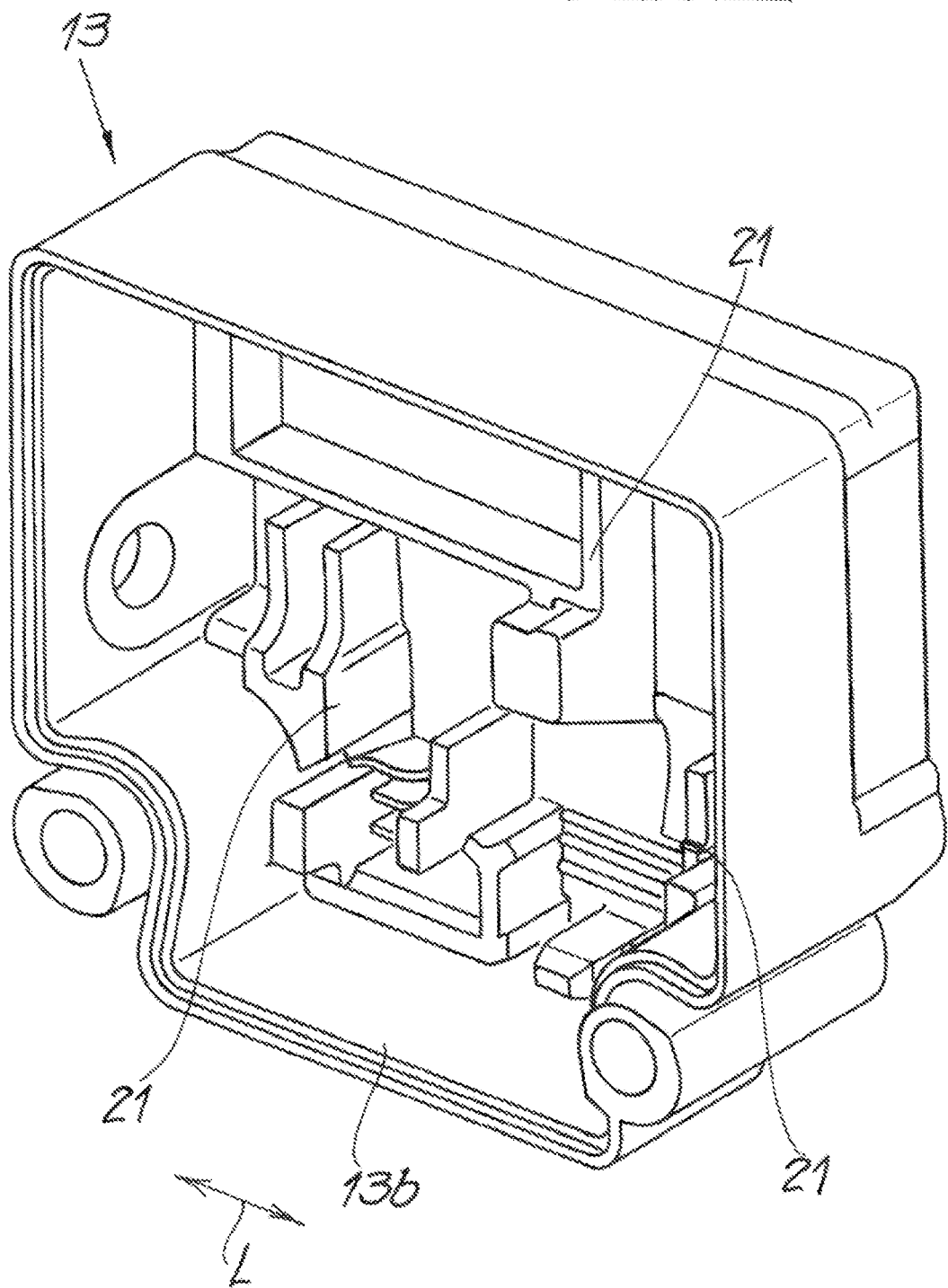
FIG. 4 shows the upper shell of the drive housing associated with the lower shell, all in perspective.

As already explained, the drive housing 13 is advantageously designed in two parts. In this connection the drive housing 13 has the lower shell 13a primarily illustrated in FIG. 3, which comprises the protrusions 21 with the associated bearing points 17; 18, 19 and defines them. As described, the lower shell 13a can be equipped in the installation direction with the drive elements 8 to 11. Subsequently the upper shell 13b illustrated in FIG. 4 is fitted onto the equipped lower shell 13a and as a result the drive housing 13 is closed. Since the electromotive drive 8 to 11 is combined with the locking element 6 and is accommodated overall in the drive housing 13, an assembly or a module which is ready for installation is available for mounting in or on the body 1. In this case, of course, it must be ensured that an operator can reach and act upon the crank 20 in the event of any necessary emergency unlocking. Thus, in principle, at least the crank 20 must be from accessible from the exterior.

The invention claimed is:

1. An electromotive drive for automotive applications, the electromotive drive being a component of a locking device of an electric connection device for electric or hybrid vehicles, the electromotive drive comprising:
   an electric motor,
   a multistage transmission arranged downstream the electric motor and including drive elements for acting upon a locking element of the locking device, and a drive housing which houses the drive elements, wherein the drive housing is equipped with inner and/or edge-side protrusions which have direct bearing points for at least one of the drive elements, wherein the locking element includes a stepped projection, wherein the projection comprises a first contact surface and a second contact surface spaced apart from the first contact surface, wherein the stepped projection engages a corresponding recess formed when a charging plug engages a charging plug socket in a locked state.

2. The electromotive drive according to claim 1, wherein the drive elements include stationary drive elements, and wherein the inner and/or edge-side protrusions are equipped with the direct bearing points for the stationary drive elements.

3. The electromotive drive according to claim 1, wherein the drive elements include movable drive elements, and wherein the inner and/or edge-side protrusions are equipped with the direct bearing points for the movable drive elements.

4. The electromotive drive according to claim 1, wherein the inner and/or edge-side protrusions are formed integrally on the drive housing.

5. The electromotive drive according to claim 4, wherein the inner and/or edge-side protrusions and the drive housing are formed as a one-piece plastic molding.

6. The electromotive drive according to claim 1, wherein the inner and/or edge-side protrusions are configured as housing ribs on the drive housing.

7. The electromotive drive according to claim 6, wherein the housing ribs have an extent in a transverse direction by comparison with an axial direction of an associated one of the drive elements.

8. The electromotive drive according to claim 1, wherein the direct bearing points are configured for axially and/or radially securing the drive elements.

9. The electromotive drive according to claim 1, wherein the bearing points are each opened in an installation direction of the drive elements.

10. The electromotive drive according to claim 1, wherein the drive housing includes a lower shell including the inner and/or edge-side protrusions, and an upper shell which closes the lower shell as a closure for the lower shell.

11. The electromotive drive according to claim 1, wherein the bearing points are configured for reinforcement and/or stabilization of the drive housing.

12. The electromotive drive according to claim 1, wherein the drive elements include stationary drive elements and movable drive elements, and wherein the direct bearing points of the inner and/or edge-side protrusions are configured to accommodate the stationary drive elements and the movable drive elements.

13. The electromotive drive according to claim 12, wherein the movable drive elements include shafts of the multistage transmission, each of the shafts defining a stage of the multistage transmission.

14. The electromotive drive according to claim 13, wherein the shafts extend parallel to each other and the inner and/or edge-side protrusions extend transversely relative to the shafts.

15. The electromotive drive according to claim 12, wherein the movable drive elements and the inner and/or edge-side protrusions are both formed of plastic.

16. The electromotive drive according to claim 12, wherein the stationary drive elements include the electric motor.

17. The electromotive drive according to claim 1, wherein the direct bearing points have a U-shaped cross section.

18. The electromotive drive according to claim 7, wherein the housing ribs are spaced relative to each other.

19. The electromotive drive according to claim 18, wherein all of the housing ribs extend in the transverse direction.

* * * * *